United States Patent
Ham (10) Patent No.: US 9,690,037 B2
(45) Date of Patent: Jun. 27, 2017

(54) LIQUID CRYSTAL DISPLAY DEVICE INCLUDING BOUNDARY FLUORESCENT BODY

(71) Applicant: LG Display Co., Ltd., Seoul (KR)

(72) Inventor: Jung-Hyun Ham, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/880,627

(22) Filed: Oct. 12, 2015

(65) Prior Publication Data
US 2016/0377786 A1     Dec. 29, 2016

(30) Foreign Application Priority Data
Jun. 24, 2015 (KR) ...................... 10-2015-0089403

(51) Int. Cl.
G02F 1/1335 (2006.01)
F21V 8/00 (2006.01)

(52) U.S. Cl.
CPC ........... *G02B 6/005* (2013.01); *G02B 6/0055* (2013.01); *G02B 6/0088* (2013.01); *G02F 1/133603* (2013.01); *G02F 2001/133614* (2013.01)

(58) Field of Classification Search
CPC ............... G02F 1/133603; G02F 2001/133614
See application file for complete search history.

(56) References Cited

U.S. PATENT DOCUMENTS

2014/0319995 A1* 10/2014 Kim .................. G02F 1/133512
313/501

* cited by examiner

*Primary Examiner* — Phu Vu
(74) *Attorney, Agent, or Firm* — Fenwick & West LLP

(57) ABSTRACT

A liquid crystal display device including a backlight unit and a fluorescent film, and a boundary fluorescent body is described.

19 Claims, 7 Drawing Sheets

LIQUID CRYSTAL DISPLAY DEVICE INCLUDING BOUNDARY FLUORESCENT BODY

This application claims the benefit of Korean Patent Application No. 10-2015-0089403, filed on Jun. 24 2015, which is hereby incorporated by reference as if fully set forth herein.

BACKGROUND OF THE INVENTION

Field of the Invention

The present invention relates to a backlight unit capable of alleviating a light leakage phenomenon and a liquid crystal display device including the same.

Discussion of the Related Art

In general, a liquid crystal display device is one of flat panel display devices, which displays images using a liquid crystal. The liquid crystal display device is widely used in various industrial fields in view of its advantages of thinness, lightness, low driving voltage, and low power consumption, when compared to other display devices.

Since a liquid crystal display panel for displaying images does not itself emit light, the liquid crystal display device uses a backlight unit including a light source for supplying light.

A light emitting diode (LED) is mainly used as a light source because the LED has the advantages of high response speed, excellent color reproducibility, and environmental-friendliness compared to a cold cathode fluorescent lamp (CCFL).

Figure 1:
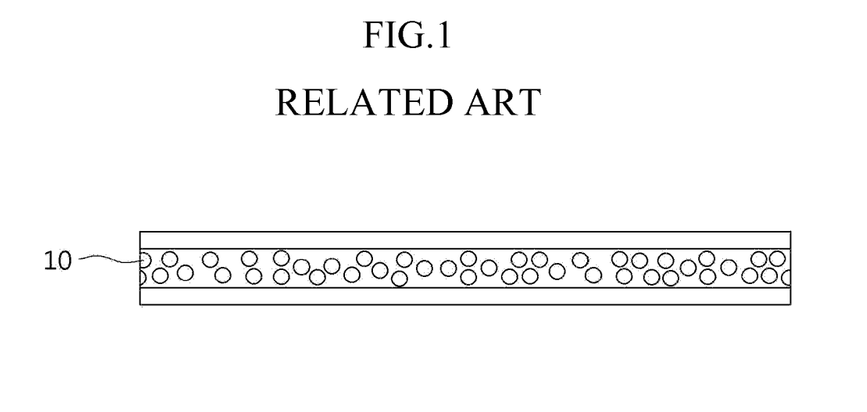
FIG. 1 is a sectional view illustrating a conventional fluorescent film.

Recently, the liquid crystal display device is configured to form images on the liquid crystal display panel using a fluorescent film having quantum dots and white light generated from the LED. However, when the fluorescent film is cut corresponding to the size of the liquid crystal display panel, as shown in FIG. 1, a part of the quantum dot 10, which is located at an edge portion of the fluorescent film, is also cut off. Accordingly, the cross section of the quantum dot 10 is exposed from the lateral surface of the fluorescent film, and thus external moisture and oxygen permeate the exposed cross section of the quantum dot 10, and the properties of the quantum dot 10 are lost. The quantum dot 10, having lost its properties, cannot normally emit light having its own color. Further, the surface area of the quantum dot 10 that is cut in the fluorescent film cutting process becomes smaller than that of uncut quantum dots, and therefore the light incident on the fluorescent film from the LED cannot be properly converted into the color of the quantum dot 10.

Accordingly, some of the light incident on the edge region of the fluorescent film is projected through the edge region of the fluorescent film without mixing with the light converted by the quantum dot 10, which causes a light leakage phenomenon, whereby light having a specific wavelength leaks through the edge region of the fluorescent film. If the bezel is increased in size in order to prevent the light leakage phenomenon, the display area is decreased.

SUMMARY OF THE INVENTION

A liquid crystal display device including a backlight unit and a fluorescent film, and a boundary fluorescent body is described. The backlight unit emits one or more wavelengths of light. The fluorescent film includes quantum dots that convert at least some of the light from the backlight unit passing through the film into other wavelengths of light so that together the light exiting the fluorescent film is white light. The boundary fluorescent body is formed in a quadrangle frame shaped to match the outer edge of the fluorescent film to remedy any performance degradation of the fluorescent film at the outer edge of the display device. Like the fluorescent film the boundary fluorescent body also includes quantum dots to convert incident light into another wavelength of light such that the resulting white light is more uniform across the entire extent of the display device. The liquid crystal display device may also include other components, such as a display panel that realizes an image using light emitted by the light guide plate, the fluorescent film, and the boundary fluorescent body.

It is to be understood that both the foregoing general description and the following detailed description of the present invention are exemplary and explanatory and are intended to provide further explanation of the invention as claimed.

An object of the present invention is to provide a backlight unit capable of alleviating a light leakage phenomenon and a liquid crystal display device including the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. The preferred embodiments described in the specification and shown in the drawings are illustrative only and are not intended to represent all aspects of the invention.

Wherever possible, the same reference numbers will be used throughout the drawings to refer to the same or like parts. In the drawings, the component's size, shape, etc. are exaggerated for clarity and convenience.

Hereinafter, preferred embodiments of the present invention will be described in detail with reference to the attached drawings.

Figure 2:
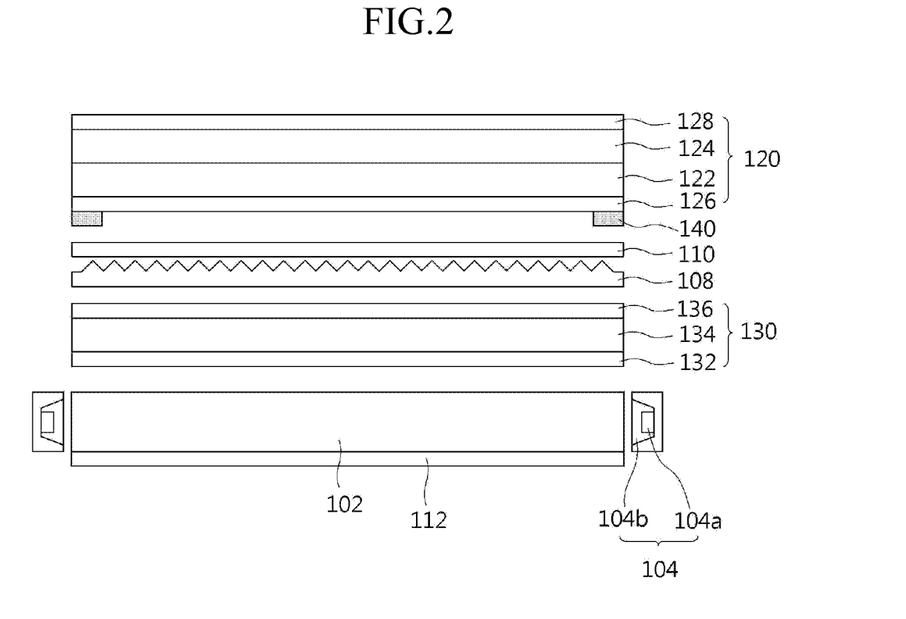
FIG. 2 is a sectional view illustrating a liquid crystal display device according to a first embodiment of the present invention.

FIG. 2 is a sectional view illustrating a liquid crystal display device according to a first embodiment of the present invention.

The liquid crystal display device depicted in FIG. 2 comprises a liquid crystal display panel 120 and a backlight unit.

The backlight unit is arranged beneath the liquid crystal display panel 120, and supplies light to the liquid crystal display panel 120. The backlight unit includes a light source package 104, a light guide plate 102, a fluorescent film 130, a plurality of optical sheets 108 and 110, and a reflective sheet 112.

The light source package 104 is configured to be driven by receiving external power and generate light. The light source package 104 includes a light emitting diode (LED) 104a and a protective resin 104b for protecting the LED 104a. Light emitted from the LED 104a is incident on the light guide plate 102. The light source package 104 is arranged to face at least one surface of the light guide plate 102. In an example, the light source package 104 may be provided to face both lateral surfaces of the light guide plate 102 for reduction in power consumption and cost.

The optical sheets include a diffusion sheet 110 and a prism sheet 108, and are arranged above the light guide plate 102. The prism sheet 108 functions to concentrate the incident light, having passed through the light guide plate 102, on the diffusion sheet 110. At this time, the light having passed through the prism sheet 108 progresses perpendicularly to the diffusion sheet 110. The diffusion sheet 110 functions to diffuse the incident light having passed through the prism sheet 108 and adjust the direction of the light so that the light progresses toward the liquid crystal display panel 120.

The reflective sheet 112 is disposed beneath the light guide plate 102, and functions to reflect some of the light emitted from the light source package 104, which is directed to the outside through the bottom surface of the light guide plate 102, to the light guide plate 102.

The light guide plate 102 is arranged to face the light source package 104 so as to guide the light incident from the light source package 104, and functions to diffuse and concentrate the guided light and project the light ahead of the light guide plate 102.

The fluorescent film 130 includes upper and lower barrier films 132 and 136, which are arranged opposite to each other, and a quantum dot layer 134 disposed between the upper and lower barrier films 132 and 136.

The upper and lower barrier films 132 and 136 are made of a resin which protects the quantum dot layer 134 and has excellent light transmittance. The upper and lower barrier films 132 and 136 are made of, for example, at least one material selected from polyethylene terephthalate (PET), polyethylene naphthalate, acrylic resin, polycarbonate, polystyrene, and polycarbonate (PC).

The quantum dot layer 134 is configured to include at least one of red quantum dots, green quantum dots and blue quantum dots, which have different sizes. For example, the red quantum dots are formed to be bigger than the green and blue quantum dots, and the blue quantum dots are formed to be smaller than the red and green quantum dots. The red quantum dots absorb light of a specific color emitted from the light source package 104 and convert the light into red light, the green quantum dots absorb light of a specific color emitted from the light source package 104 and convert the light into green light, and the blue quantum dots absorb light of a specific color emitted from the light source package 104 and convert the light into blue light. Accordingly, the light of a specific color emitted from the light source package 104 is converted into white light through the fluorescent film 130 and projected toward the liquid crystal display panel 120.

The liquid crystal display panel 120 realizes an image using the light projected through the light guide plate 102. The liquid crystal display panel 120 includes upper and lower substrates 124 and 122, which are arranged opposite to each other with a liquid crystal layer intervening therebetween, and polarizing plates 128 and 126, which are respectively attached to the upper and lower substrates 124 and 122.

Formed on the lower substrate 122 are a plurality of data lines and a plurality of gate lines, which cross each other. By such a crossing structure of the data lines and the gate lines, liquid crystal cells are arranged on the liquid crystal display panel 120 in a matrix shape. The lower substrate 122 further includes a thin film transistor (TFT), a pixel electrode of the liquid crystal cell connected with the TFT, and a storage capacitor. The liquid crystal cells are driven by data voltage supplied to the pixel electrode through the data lines and an electric field generated by the difference in potential of common voltage supplied to a common electrode, thereby adjusting the amount of light transmitted through the liquid crystal display panel 120.

Formed on the upper substrate 124 are a black matrix, a color filter, and a common electrode. The common electrode is formed on the upper substrate 124 in devices employing a vertical electric field driving method, such as a TN (Twisted Nematic) mode or a VA (Vertical Alignment) mode. Alternatively, the common electrode is formed along with the pixel electrode on the lower substrate 122 in devices employing a horizontal electric field driving method, such as an IPS (In Plane Switching) mode or an FFS (Fringe Field Switching) mode.

The upper polarizing plate 128 is attached to the top surface of the upper substrate 124 of the liquid crystal display panel 120, and the lower polarizing plate 126 is attached to the bottom surface of the lower substrate 122 of the liquid crystal display panel 120.

Figure 3:
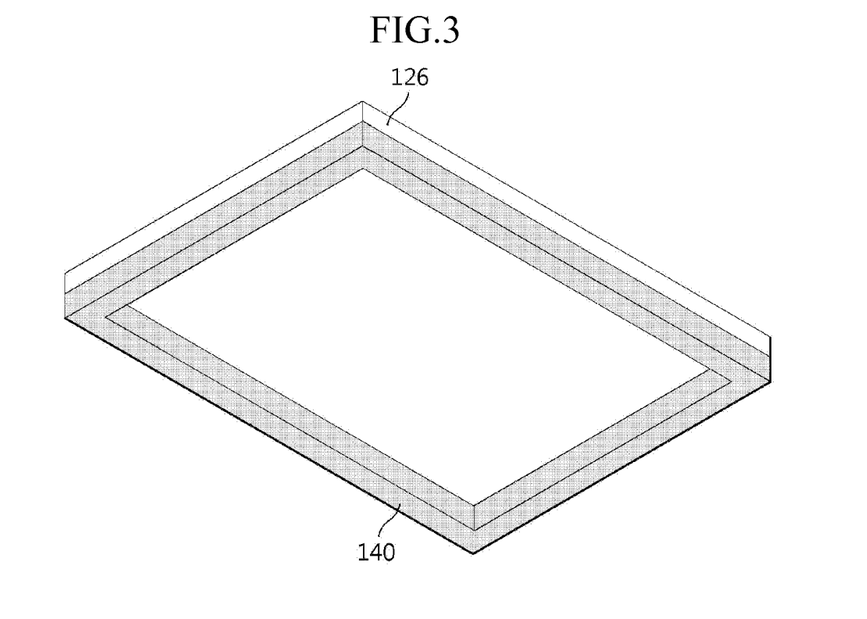
FIG. 3 is a perspective view for explaining a fluorescent film depicted in FIG. 2 in detail.
Figure 4:
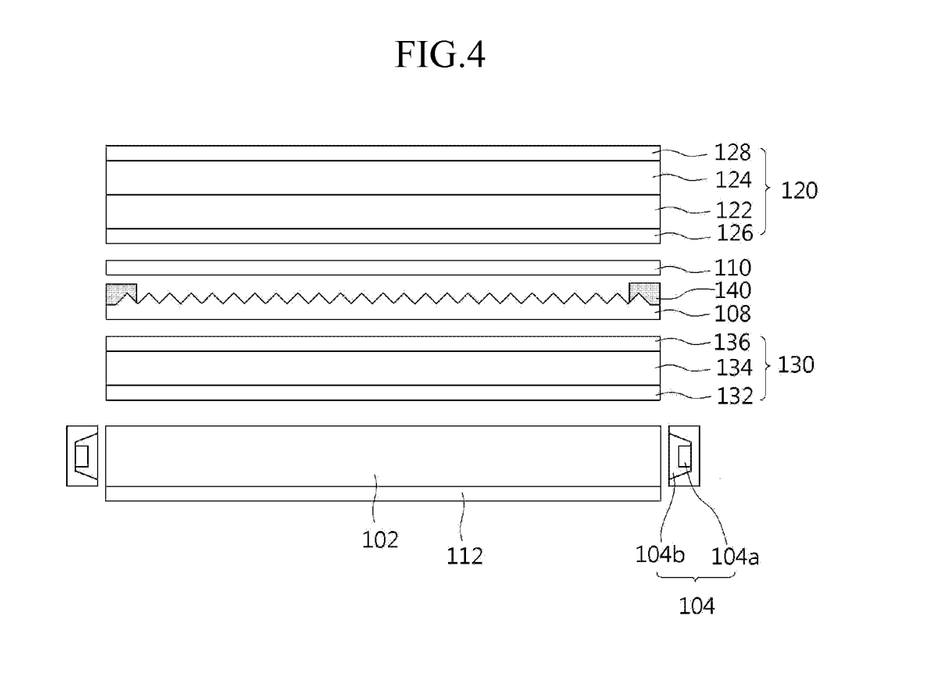
FIG. 4 is a sectional view illustrating another exemplary boundary fluorescent body of a liquid crystal display device according to a first embodiment of the present invention.

Provided between the color filter formed on the upper substrate 124 of the liquid crystal display panel 120 and the fluorescent film 130 is a boundary fluorescent body 140, which overlaps the edge region of the fluorescent film 130. For example, the boundary fluorescent body 140, as shown in FIG. 3, is formed along the edges on the bottom surface of the lower polarizing plate 126. Alternatively, as shown in FIG. 4, the boundary fluorescent body 140 is formed along the edges on the top surface or bottom surface of the prism sheet 108. The boundary fluorescent body 140, as shown in FIG. 3, is formed in a quadrangle frame shape so as to overlap the edge region located along four sides of the fluorescent film 130, or is formed to overlap the edge region located along at least two sides (top-bottom sides, left-right sides, top-left-right sides) of the fluorescent film 130. The overlap may be such that the body 140 is flush with the outer edge of the film 130, or the body may extend past the outer edge of the film 130 by some distance.

In one embodiment, along the axis running parallel to the surface of the display panel 120, the quadrangle frame forming the boundary fluorescent body 140 is shaped as two concentric quadrilaterals, herein referred to as an inner and an outer quadrilateral. The contents of the boundary fluorescent body 140 may comprise the same contents as film 130, located in between the inner and outer quadrilaterals.

The outer edges of the outermost quadrilateral, that is the outer edges of the frame itself, are formed to be either the same size (i.e., length, width) as the outer edge of the fluorescent film, or larger such that the body's 140 second fluorescent film overlaps film 130. The space inside the inner quadrilateral is vacant of fluorescent material, and thus light is able to pass freely through this space between layers of the display device. In practice, this vacant space may be filled with other material (such as the layers 108 or 110) due to compression of the entire device during manufacturing.

The boundary fluorescent body 140 is made of a material that emits light of the same color as the quantum dot layer 134 of the fluorescent film 130. For example, the boundary fluorescent body 140 is formed to have the same structure and the same material as the fluorescent film 130. For sake of convenience, the contents of the body 140 may be referred to as a second fluorescent film in cases where it has the same structure and same material as the fluorescent film 130. The boundary fluorescent body 140 may be formed through a printing method, a coating method, a tape adhesion method or a patterning method.

Accordingly, since the light converted by the quantum dots in the boundary fluorescent body 140 mixes with the light projected through the edge region of the fluorescent film 130, white light is incident on the edge region of the liquid crystal display panel 120 corresponding to the edge region of the fluorescent film 140. In other words, the boundary fluorescent body 140 converts the light, which is projected through the edge region of the fluorescent film 130 without mixing with the light of a specific wavelength converted by the quantum dots located within the edge region of the fluorescent film 130, into white light.

Figure 5A:
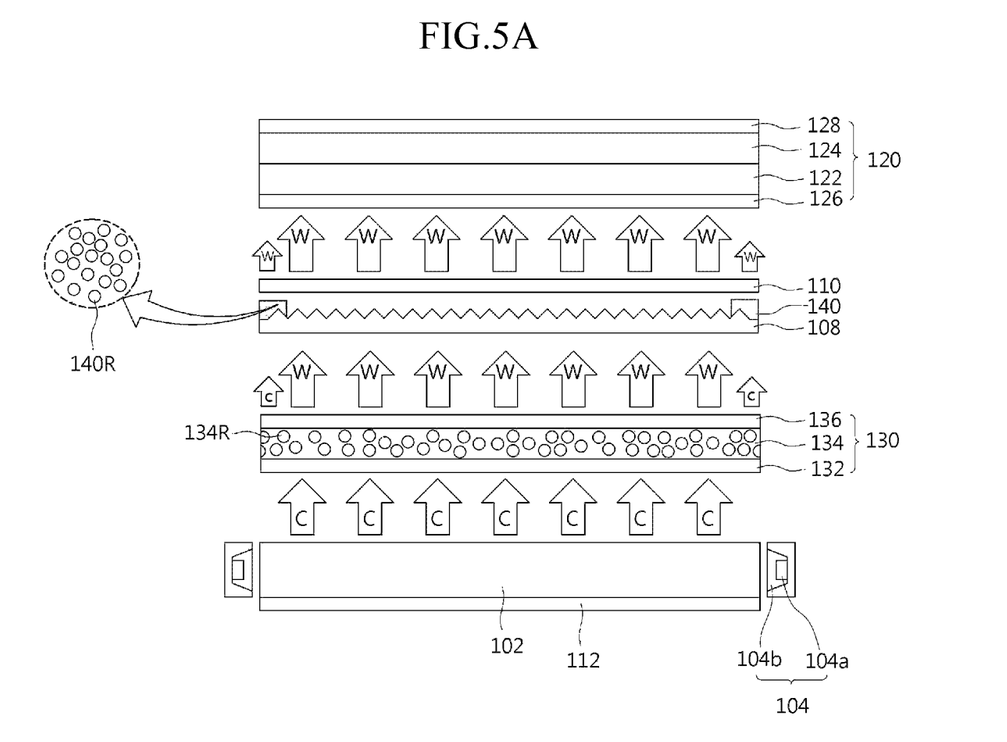
FIGS. 5a through 5c are sectional views for explaining a white light conversion process performed by various configurations of a light source package, a fluorescent film and a boundary fluorescent body in the liquid crystal display device depicted in FIG. 4.

In particular, as shown in FIG. 5a, in the case in which the light source package 104 includes a protective resin 104b having a green fluorescent substance and a blue light emitting diode 104a, both the fluorescent film 130 and the boundary fluorescent body 140 have red quantum dots 134R and 140R. The light source package 104, in which green light from the green fluorescent substance and blue light from the blue light emitting diode 104a mix, emits cyan light C. Some of the cyan light C incident on the fluorescent film 130 from the light source package 104 is converted into red light by the red quantum dots 134R of the fluorescent film 130, and the converted red light mixes with the remainder of the cyan light C incident on the fluorescent film 130 and is converted into white light W. At this time, there occurs a phenomenon whereby the red quantum dots 134R located near the edges of the fluorescent film 130, which have lost their properties, cannot normally convert the cyan light C incident on the edge region of the fluorescent film 130 into red light. In this case, the cyan light C cannot mix with the red light in the edge region of the fluorescent film 130, and is incident on the boundary fluorescent body 140. Some of the cyan light C incident on the boundary fluorescent body 140 is converted into red light by the red quantum dots 140R of the boundary fluorescent body 140, and the converted red light mixes with the remainder of the cyan light C incident on the boundary fluorescent body 140 and is converted into white light W. The converted white light W is incident on the liquid crystal display panel 120, and the liquid crystal display panel 120 realizes an image using the white light W.

Figure 5B:
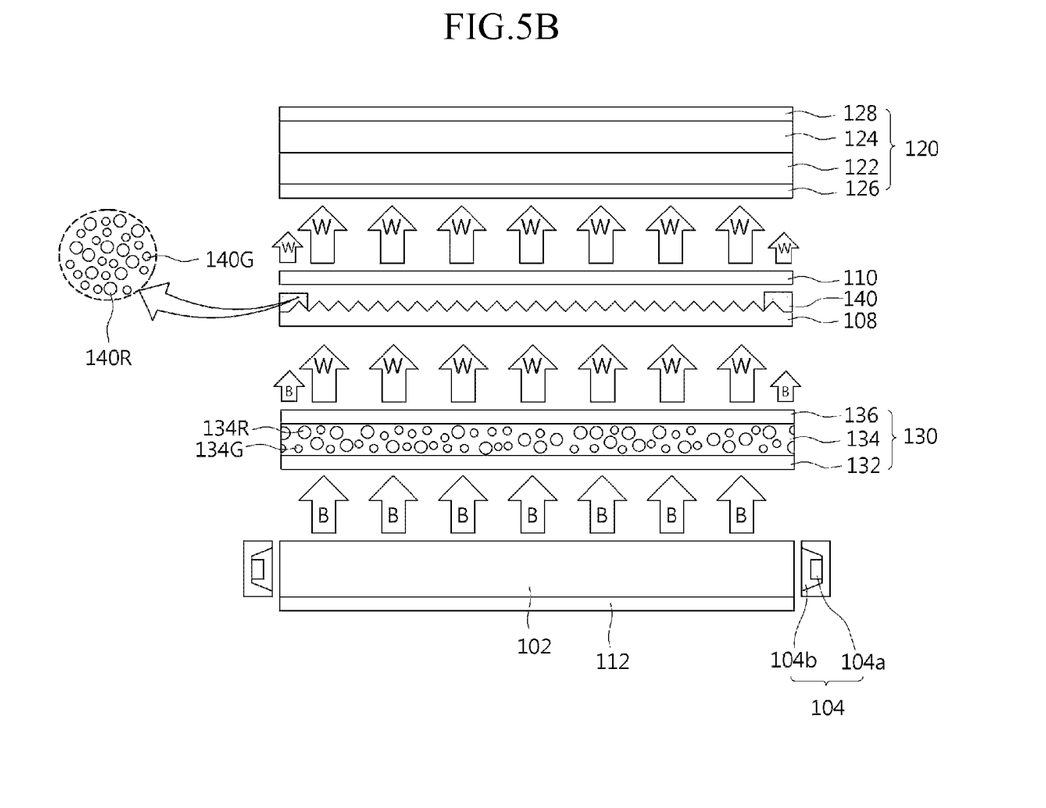

As shown in FIG. 5b, in the case in which the light source package 104 includes a transparent protective resin 104b and a blue light emitting diode 104a, both the fluorescent film 130 and the boundary fluorescent body 140 have red and green quantum dots 134R, 134G, 140R and 140G. The light source package 104 emits blue light B from the blue light emitting diode 104a. Some of the blue light B incident on the fluorescent film 130 from the light source package 104 is converted into red light and green light by the red and green quantum dots 134R and 134G of the fluorescent film 130, and the converted red light and green light mix with the remainder of the blue light B incident on the fluorescent film 130 and are converted into white light W. At this time, there occurs a phenomenon whereby the red and green quantum dots 134R and 134G located near the edges of the fluorescent film 130, which have lost their properties, cannot normally convert the blue light B incident on the edge region of the fluorescent film 130 into red light and green light. In this case, the blue light B cannot mix with the red light and green light in the edge region of the fluorescent film 130, and is incident on the boundary fluorescent body 140. Some of the blue light B incident on the boundary fluorescent body 140 is converted into red light and green light by the red and green quantum dots 140R and 140G of the boundary fluorescent body 140, and the converted red light and green light mix with the remainder of the blue light B incident on the boundary fluorescent body 140 and are converted into white light W. The converted white light W is incident on the liquid crystal display panel 120, and the liquid crystal display panel 120 realizes an image using the white light W.

Figure 5C:
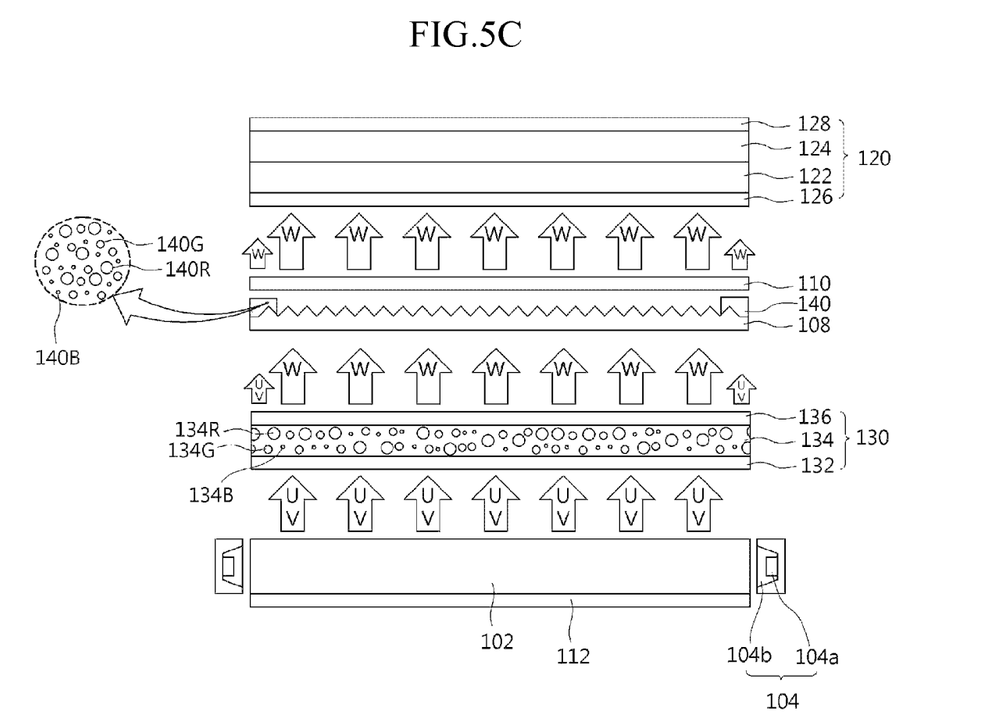

As shown in FIG. 5c, in the case in which the light source package 104 includes a transparent protective resin 104b and an ultraviolet light emitting diode 104a, both the fluorescent film 130 and the boundary fluorescent body 140 have red, green and blue quantum dots 134R, 134G, 134B, 140R, 140G and 140B. The light source package 104 emits ultraviolet light (UV) from the ultraviolet light emitting diode 104a. Some of the ultraviolet light (UV) incident on the fluorescent film 130 from the light source package 104 is converted into red light, green light and blue light by the red, green and blue quantum dots 134R, 134G and 134B of the fluorescent film 130, and the converted red light, green light and blue light mix with the remainder of the ultraviolet light (UV) incident on the fluorescent film 130 and are converted into white light W. At this time, there occurs a phenomenon whereby the red, green and blue quantum dots 134R, 134G and 134B located near the edges of the fluorescent film 130, which have lost their properties, cannot normally convert the ultraviolet light (UV) incident on the edge region of the fluorescent film 130 into red light, green light and blue light. In this case, the ultraviolet light (UV) cannot mix with the red light, green light and blue light in the edge region of the fluorescent film 130, and is incident on the boundary fluorescent body 140. Some of the ultraviolet light (UV) incident on the boundary fluorescent body 140 is converted into red light, green light and blue light by the red, green and blue quantum dots 140R, 140G and 140B of the boundary fluorescent body 140, and the converted red light, green light and blue light mix with the remainder of the ultraviolet light (UV) incident on the boundary fluorescent body 140 and are converted into white light W. The converted white light W is incident on the liquid crystal display panel 120, and the liquid crystal display panel 120 realizes an image using the white light W.

As described above, according to the present invention, the boundary fluorescent body 140 is disposed above and/or below the fluorescent film 130 so as to overlap the edge region of the fluorescent film 130. The boundary fluorescent body 140 converts the light, which is projected through the edge region of the fluorescent film 130 without mixing with the light converted by the quantum dots of the fluorescent film 130, into white light. Accordingly, the light color mixing efficiency in the edge region of the liquid crystal display device according to the present invention is improved by the boundary fluorescent body 140, thereby reducing a light leakage phenomenon in the edge region without increasing the size of a bezel.

Figure 6:
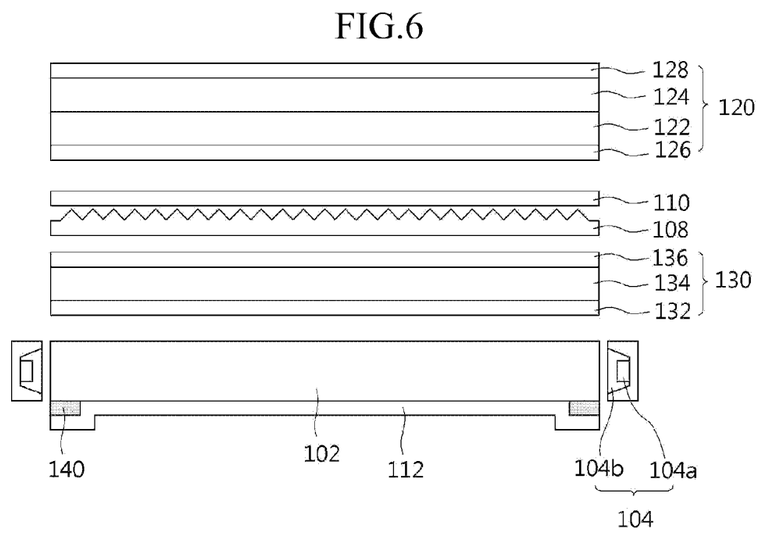
FIG. 6 is a sectional view illustrating a liquid crystal display device according to a second embodiment of the present invention.

FIG. 6 is a sectional view illustrating a liquid crystal display device according to a second embodiment of the present invention.

The liquid crystal display device shown in FIG. 6 includes the same components as those of the liquid crystal display device shown in FIG. 2 except for a boundary fluorescent body which is provided on a light guide plate. Therefore, a detailed explanation of the same components will be omitted.

The boundary fluorescent body 140 shown in FIG. 6 is disposed on at least one of the top surface and the bottom surface of the light guide plate 102 so as to overlap the edge region of the fluorescent film 130. For example, in the case in which the light guide plate 102 has a prism-shaped light guide pattern formed on the top surface thereof, the boundary fluorescent body 140 is provided along the edges on the bottom surface of the light guide plate 102 in order to increase adhesion.

The boundary fluorescent body 140 is made of a material which emits light of the same color as the quantum dot layer 134 of the fluorescent film 130. For example, the boundary fluorescent body 140 is formed to have the same structure and the same material as the fluorescent film 130.

The boundary fluorescent body 140 functions to adjust the proportion of the light of a specific color incident on the fluorescent film 130 in consideration of the proportion of the quantum dots which are located near the edges of the fluorescent film 130 and have lost their properties. That is, the proportion of the light of a specific color incident on the edge region of the fluorescent film 130 is adjusted to be lower than that of the light of a specific color incident on the central region of the fluorescent film 130. For example, if the quantum dots of the fluorescent film 130 are red quantum dots, the proportion of the cyan light incident on the edge region of the fluorescent film 130 is adjusted to be lower than that of the cyan light incident on the central region of the fluorescent film 130. Accordingly, since all the red light converted by the quantum dots of the fluorescent film 130 mixes with the cyan light incident on the edge region of the fluorescent film 130 at a low proportion, white light is projected without a light leakage phenomenon. As a result, the light color mixing efficiency in the edge region of the liquid crystal display device according to the present invention is improved by the boundary fluorescent body 140, thereby reducing a light leakage phenomenon in the edge region without increasing the size of a bezel.

Figure 7:
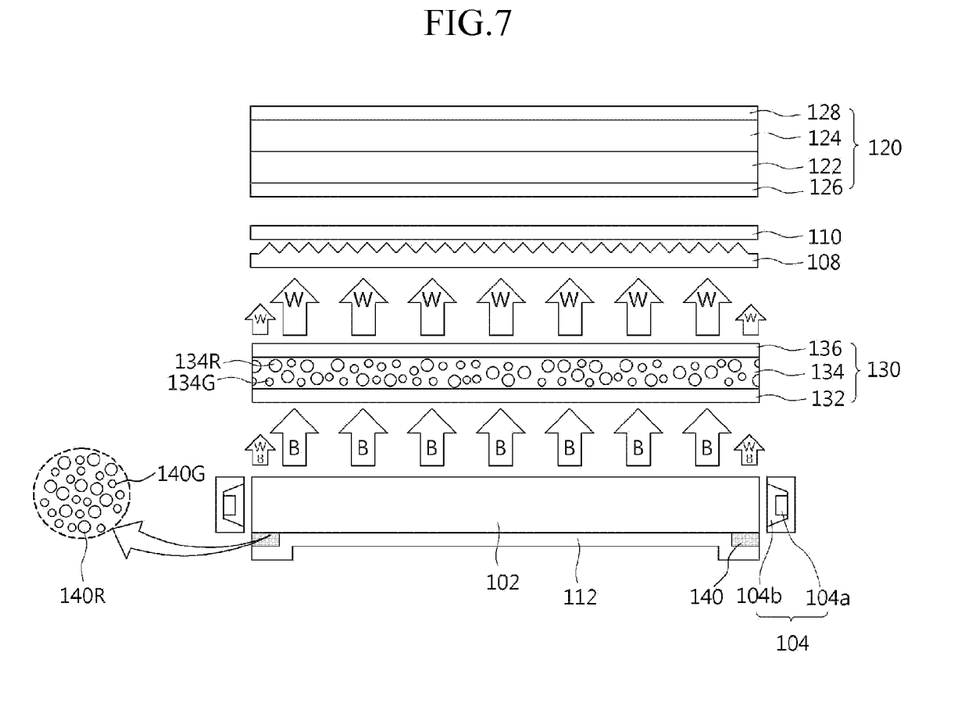
FIG. 7 is a sectional view for explaining a white light conversion process performed by a light source package, a fluorescent film and a boundary fluorescent body in the liquid crystal display device depicted in FIG. 6.

In particular, as shown in FIG. 7, in the case in which the light source package 104 includes a transparent protective resin 104b and a blue light emitting diode 104a, both the fluorescent film 130 and the boundary fluorescent body 140 have red and green quantum dots 134R, 134G, 140R and 140G. The light source package 104 emits blue light B from the blue light emitting diode 104a. Some of the blue light B incident on the boundary fluorescent body 140 from the light source package 104 is converted into red light and green light by the red and green quantum dots 140R and 140G of the boundary fluorescent body 140, and the converted red light and green light mix with the remainder of the blue light B incident on the boundary fluorescent body 140 and are converted into blue light B added with white light W. At this time, the red and green quantum dots 134R and 134G, which are located near the edges of the fluorescent film 130 and have lost their properties, convert some of the blue light B added with the white light W into red light and green light, and the converted red light and green light mix with the remainder of the blue light B incident on the fluorescent film 130 and are converted into white light W. The converted white light W is incident on the liquid crystal display panel 120, and the liquid crystal display panel 120 realizes an image using the white light W.

As described above, in the second embodiment of the present invention, the boundary fluorescent body 140 is disposed on at least one of the top surface and the bottom surface of the light guide plate 102 so as to overlap the edge region of the fluorescent film 130. The boundary fluorescent body 140 functions to adjust the proportion of the light incident on the fluorescent film 130 in consideration of the proportion of the quantum dots which are located near the edges of the fluorescent film 130 and have lost their properties. Accordingly, since the light incident on the edge region of the fluorescent film 130 at a low proportion and the light converted by the quantum dots of the fluorescent film 130 completely mix, white light is projected without a light leakage phenomenon. As a result, the light color mixing efficiency in the edge region of the liquid crystal display device according to the present invention is improved by the boundary fluorescent body 140, thereby reducing a light leakage phenomenon in the edge region without increasing the size of a bezel.

Figure 8A:
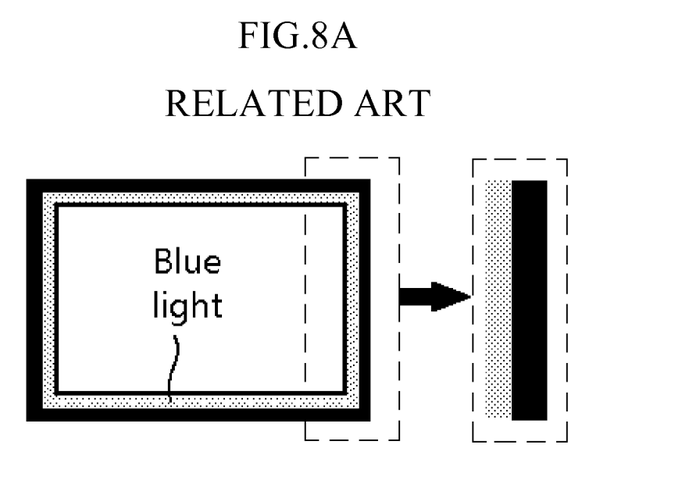
FIGS. 8a and 8b are views for explaining the results of light leakage experiments on a conventional liquid crystal display device and a liquid crystal display device according to the present invention.
Figure 8B:
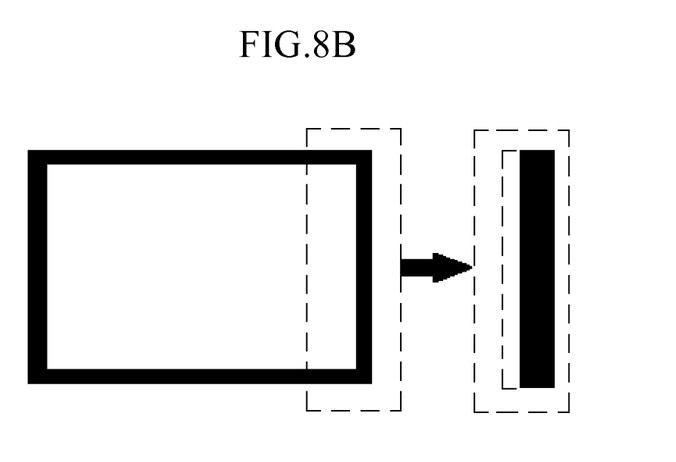

FIGS. 8a and 8b are views for explaining the results of light leakage experiments on a conventional liquid crystal display device and the liquid crystal display device according to the present invention.

The conventional liquid crystal display device, as shown in FIG. 8a, shows that blue light leaks from the edge region near the bezel. However, the liquid crystal display device according to the present invention, as shown in FIG. 8b, shows that blue light leakage from the edge region near the bezel is minimized by virtue of the increase in light color mixing efficiency by the boundary fluorescent body 140.

Although it has been described that the boundary fluorescent body 140 is disposed above the fluorescent film 130 in the first embodiment of the present invention, and disposed below the fluorescent film 130 in the second embodiment of the present invention, the boundary fluorescent body 140 may also be disposed both above and below the fluorescent film 130. For example, the boundary fluorescent body 140 may be provided at both the light guide plate 102 and the prism sheet 108.

As is apparent from the above description, the light color mixing efficiency in the edge region of the liquid crystal display device according to the present invention is improved by the boundary fluorescent body, thereby reducing a light leakage phenomenon in the edge region without increasing the size of a bezel.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display (LCD) device comprising:
a light guide plate projecting light emitted from a light source;
a fluorescent film comprising quantum dots of at least one size, the fluorescent film comprising an outer edge;
a boundary fluorescent body formed in a frame that overlaps the outer edge of the fluorescent film, the boundary fluorescent body comprising quantum dots of the at least one size; and
a LCD display panel that realizes an image using light transmitted by the light guide plate, the fluorescent film, and the boundary fluorescent body, wherein the LCD panel receives the light transmitted by the boundary fluorescent body.

2. The liquid crystal display (LCD) device of claim 1 wherein the frame of the boundary fluorescent body is shaped as an inner and an outer quadrilateral with a second fluorescent film disposed between the quadrilaterals, the second fluorescent film comprising the quantum dots of the boundary fluorescent body.

3. The liquid crystal display (LCD) device of claim 2 wherein a space between edges of the inner quadrilateral is vacant of quantum dots.

4. The liquid crystal display (LCD) device of claim 1 wherein the quantum dots of the boundary fluorescent body overlap the outer edge of the fluorescent film.

5. The liquid crystal display (LCD) device of claim 1 wherein light transmitted by the fluorescent film and light converted by the quantum dots of the fluorescent film combine to form white light away from the outer edge of the fluorescent film.

6. The liquid crystal display (LCD) device of claim 1 wherein light transmitted by the boundary fluorescent body and light converted by the quantum dots of the boundary fluorescent body combine to form white light near the outer edge of the fluorescent film.

7. The liquid crystal display (LCD) device of claim 1 wherein the sizes of the quantum dots used in the fluorescent film and the boundary fluorescent body are chosen to produce at least one wavelength of at least one of red, green, and blue light that is not emitted by the light source.

8. The liquid crystal display (LCD) device of claim 1
wherein the light source emits green light and blue light;
wherein the fluorescent film and the boundary fluorescent body both comprise quantum dots that absorb at least some of the green and the blue light and transmit red light; and
wherein the green and the blue light not absorbed by the quantum dots of the fluorescent film and the boundary fluorescent body combine with the red light transmitted by the fluorescent film and the boundary fluorescent body to form white light incident on the LCD display panel.

9. The liquid crystal display (LCD) device of claim 1
wherein the light source emits blue light;
wherein the fluorescent film and the boundary fluorescent body both comprise quantum dots that absorb at least some of the blue light and transmit red and green light; and
wherein the blue light not absorbed by the quantum dots of the fluorescent film and the boundary fluorescent body combines with the red and the green light transmitted by the fluorescent film and the boundary fluorescent body to form white light incident on the LCD display panel.

10. The liquid crystal display (LCD) device of claim 1
wherein the light source emits ultraviolet light;
wherein the fluorescent film and the boundary fluorescent body both comprise quantum dots that absorb at least some of the ultraviolet light and transmit red, green, and blue light; and
wherein the red, the green, and the blue light transmitted by the fluorescent film and the boundary fluorescent body combine to form white light incident on the LCD display panel.

11. The liquid crystal display (LCD) device of claim 1 wherein the boundary fluorescent body is located between the LCD display panel and the fluorescent film.

12. The liquid crystal display (LCD) device of claim 1 further comprising:
a diffusion sheet between the display panel and the fluorescent film; and
wherein the boundary fluorescent body is located between the LCD display panel and the diffusion sheet.

13. The liquid crystal display (LCD) device of claim 1 further comprising:
a diffusion sheet located between the display panel and the fluorescent film;
a prism sheet located between the diffusion sheet and the fluorescent film; and
wherein the boundary fluorescent body is located between the diffusion sheet and the prism sheet.

14. The liquid crystal display (LCD) device of claim 1 further comprising:
a reflective sheet located beneath the light guide plate; and
wherein the boundary fluorescent body is located between the reflective sheet and the light guide plate.

15. The liquid crystal display (LCD) device of claim 1 wherein the boundary fluorescent body is located between the light guide plate and the fluorescent film.

16. The liquid crystal display (LCD) device of claim 1 wherein at least one of the fluorescent film and the boundary fluorescent body comprises:
an upper barrier;
a lower barrier; and
a quantum dot layer disposed between the upper and the lower barriers.

17. The liquid crystal display (LCD) device of claim 1 wherein the LCD display panel comprises:
an upper and a lower substrate;
a liquid crystal layer located between the upper and the lower substrate; and
a plurality of polarizing plates, one of the polarizing plates attached above the upper substrate, another of the polarizing plates attached below the lower substrate.

18. The liquid crystal display (LCD) device of claim 1, wherein the LCD display panel receives light transmitted by the boundary fluorescent body without reflection.

19. The liquid crystal display (LCD) device of claim 1, wherein the quantum dots of the fluorescent film and the boundary fluorescent body comprise red quantum dots, green quantum dots, and blue quantum dots, and wherein sizes of the red quantum dots, the green quantum dots, and the blue quantum dots of the fluorescent film are a same size as those of the boundary fluorescent body, respectively.

* * * * *